Figure 1A:
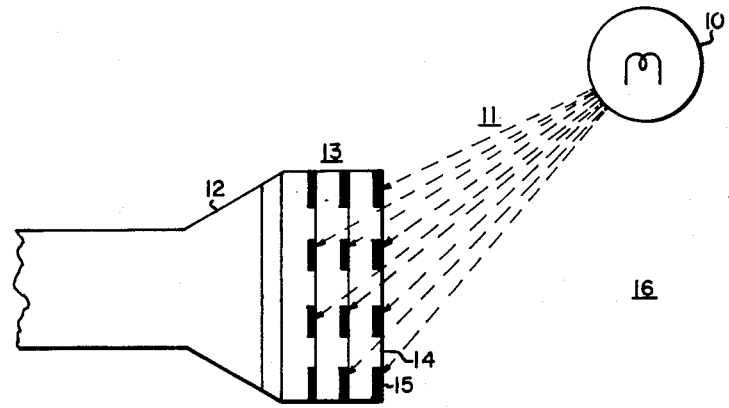

June 5, 1962 R. D. NIXON 3,037,419
DIRECTIONAL LIGHT-TRANSMISSIVE SCREEN
Filed March 10, 1959 2 Sheets-Sheet 1

United States Patent Office 3,037,419
Patented June 5, 1962

3,037,419
DIRECTIONAL LIGHT-TRANSMISSIVE SCREEN
Ralph D. Nixon, London, England, assignor to Hazeltine Research, Inc., Chicago, Ill., a corporation of Illinois
Filed Mar. 10, 1959, Ser. No. 798,453
Claims priority, application Great Britain Mar. 13, 1958
3 Claims. (Cl. 88—1)

General

This invention relates to directional light-transmissive screens, and more particularly, to screens so designed that they may transmit light incident on them at certain angles and reflect or absorb light incident at other angles. Various forms of such screens are known, for example, louvre screens consisting of parallel slats and honeycomb screens consisting of open-ended square or hexagonal compartments.

It is an object of the present invention to provide a new and improved directional light-transmissive screen.

In accordance with the present invention a directional light transmissive screen for use in producing a photographic image of the trace of a cathode-ray tube on a photographic film, comprises a plurality of plane sheets each having a similar pattern of alternate transparent and light-absorptive areas, the patterns being aligned with each other and arranged to transmit light from the cathode-ray tube over only a narrow range of angles such that a photographic image of the trace of the cathode-ray tube is produced by placing the screen between the face of the tube and the photographic film.

For a better understanding of the present invention, together with other and further objects thereof, reference is had to the following description, taken in connection with the accompanying drawings, and its scope will be pointed out in the appended claims.

Figure 1B:
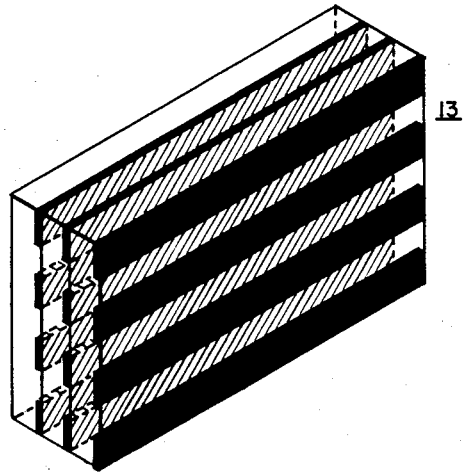
Figure 2A:
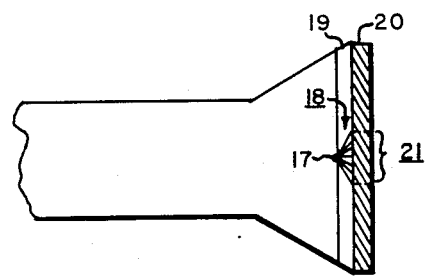
Figure 2B:
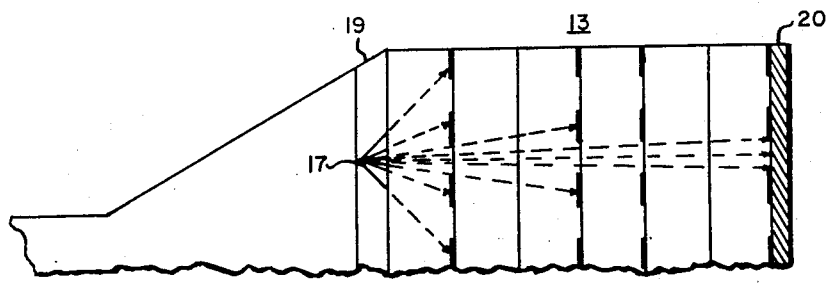
Figure 2C:
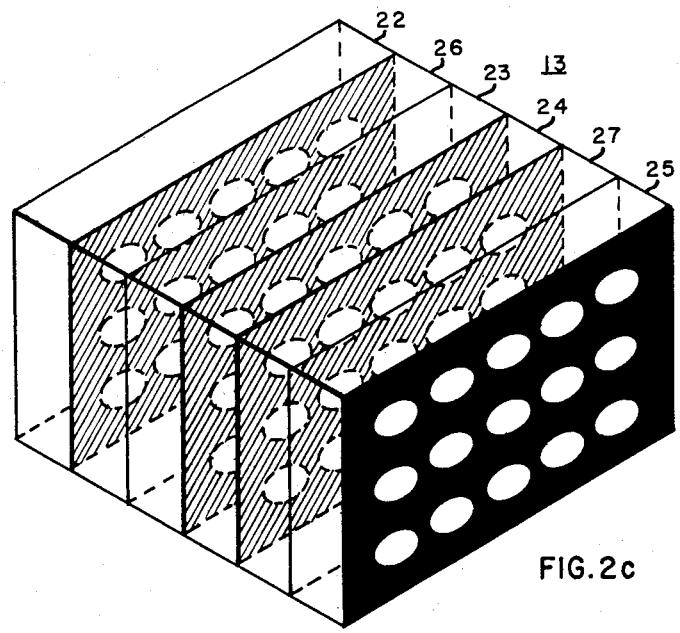

Referring to the drawings:

FIGS. 1a and 1b show a particular form of a directional light-transmissive screen used in conjunction with a cathode-ray tube to reduce objectionable glare from external light sources; and FIGS. 2a, 2b, and 2c show a particular form of a directional light-transmissive screen used in making contact-type photographs.

Description and Operation of Directional Light Transmissive Screens

FIG. 1a shows a particular form of directional light-transmissive screen used in conjunction with a cathode-ray tube to reduce objectionable glare from external light sources. A light source 10 casts light rays in all directions. Rays 11 are directed toward a cathode-ray tube 12. A directional light-transmissive screen 13, bearing a pattern of alternate transparent and light-absorptive strips 14 and 15, respectively, is positioned between the cathode-ray tube 12 and the light source 10. The strips of the screen 13 are arranged so as to allow the maximum amount of light from the fluorescent screen of the cathode-ray tube to be transmitted in the direction from which the cathode-ray tube screen is to be viewed, namely, from position 16. The strips are so oriented that light incident on the face of the cathode-ray tube from directions other than the viewing direction such as light source 10 or windows, which would normally be reflected from the glass surface of the tube causing objectionable glare or reducing the contrast in the fluorescent image, is stopped by the screen 13. While the light rays 11 are shown somewhat exaggerated, it is still clear that only a small fraction of light which originates at light source 10 actually reaches the cathode-ray tube 12. The major portion of the light is stopped by the light-absorptive areas such as light-absorptive area 15.

As shown in FIG. 1b, the screen 13 is composed of a plurality of individual sheets, each having a similar pattern of alternate transparent and light-absorptive areas. The direction in which the patterns are aligned may be either perpendicular to the general plane of the sheets or may be inclined at an angle to that plane, but in either case this direction of alignment will be the direction of maximum light-transmission of the screen. By suitable arrangement of the shape and spacing of the patterns on the sheets the screen may be made to obstruct light incident on it at directions inclined at this direction of alignment.

FIGS. 2b and 2c show a particular form of a directional light-transmissive screen used in making contact-type photographs.

FIG. 2a shows the undesirable results that would be obtained if contact-type photographs were attempted by placing photographically sensitized paper or film directly in contact with a cathode-ray tube screen. A phosphor spot 17 emits light 18 which will greatly disperse once it enters the glass surface 19. The resulting spot appearing on a film 20 covers an area 21. The resulting image on film 20 is hazy and not clear. If a light-transmissive screen 13, as shown in FIG. 2b, is placed between the glass surface 19 and the film 20, the light transmitted from the phosphor spot 17 varies over only a narrow range of angles about the normal to the surface of the cathode-ray tube. The resulting image on film 20 is therefore a more accurate reproduction of the phosphor spot 17.

As shown in FIG. 2c, the screen 13 is composed of a plurality of individual sheets 22, 23, 24, and 25, each having a similar pattern of clear circular areas on a black background. Interposed between certain of these sheets are clear sheets 26 and 27.

The pattern sheets as shown in FIGS. 1 and 2 may be constructed in a number of ways. Each individual sheet may be made of plastic with molding or machine grooves in the surface which will afterwards be filled with opaque material.

A second way is by punching holes in metal foil corresponding to the desired transparent area.

Possibly the most desirable way is to apply a photographically sensitized coating to a film or a sheet of transparent material and to photograph the desired pattern onto it. The thickness of the film or sheet used in this method may be made to correspond to the required spacing between the sheets or to some convenient sub-multiple of it so that by suitably assembling the sheets prepared in this way in the proper alignment, together with additional blank sheets if necessary, a screen may conveniently be made. The loss of light by reflection at the surface of the sheets may be reduced by cementing the sheets together with a material of similar refractive index.

While applicant does not wish to be limited to any particular dimensions, the following approximate dimensions are suitable for the directional light-transmissive screens to be described:

(1) The first embodiment is a screen to facilitate viewing of a cathode-ray tube by eliminating light reflected from the glass surface of the tube at high angles of incidence. The screen consists of three sheets of film each 0.25 millimeter thick and bearing a photographically sensitized layer on one surface. Onto this layer there is photographed a pattern consisting of parallel dark strips each 0.25 millimeter wide and separated from its neighbors by a space equal to its width. The three films are cemented together with the strips parallel to each other so that the screen consists of three sets of similar dark strips separated by distances equal to the spacing of the strips in each set. This screen may be placed in front of the end of a cathode-ray tube and transmits 50 percent of the light normally incident on it but very little of the light incident on it at angles greater than about 15° to the normal.

(2) A second embodiment is a screen for the direct photographic reproduction of cathode-ray tube traces without the use of a camera lens. This screen is prepared by photographing a pattern onto sheets of sensitized film of 0.5 millimeter thickness. The pattern consists of transparent circular areas each of diameter 0.2 millimeter in a black background and arranged with their centers at the intersections of a square array the side of each square being 0.5 millimeter. Four such sheets are prepared and assembled together with blank transparent sheets to give an arrangement with the transparent circular areas in register and separated by spacings, in order, of 1 millimeter, 0.5 millimeter, and 1 millimeter.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A directional light-transmissive screen for use in producing a photographic image of the trace of a cathode-ray tube, on a photographic film, comprising a plurality of plane sheets each having a similar pattern of alternate transparent and light absorptive areas, the patterns being aligned with each other and arranged to transmit light from said cathode-ray tube over only a narrow range of angles such that a photographic image of the trace of said cathode-ray tube is produced by placing said screen between the face of said tube and said photographic film.

2. A directional light-transmissive screen for use in producing a photographic image of the trace of a cathode-ray tube on a photographic film, comprising a plurality of plane sheets each having a substantially opaque background and a pattern of clear areas spaced at regular intervals, the patterns being aligned with each other and arranged to transmit light from said cathode-ray tube over only a narrow range of angles such that a photographic image of the trace of said cathode-ray tube is produced by placing said screen between the face of said tube and said photographic film.

3. A directional light-transmissive screen for use in producing a photographic image of the trace of a cathode-ray tube on a photographic film, comprising a plurality of plane sheets each having a substantially opaque background and a pattern of clear circles spaced at regular intervals, the patterns being aligned with each other and arranged to transmit light from said cathode-ray tube over only a narrow range of angles such that a photographic image of the trace of said cathode-ray tube is produced by placing said screen between the face of said tube and said photographic film.

References Cited in the file of this patent
UNITED STATES PATENTS

| | | |
|---|---|---|
| 2,327,918 | Miller | Aug. 24, 1943 |
| 2,511,590 | Keck | June 13, 1950 |
| 2,536,301 | Mayu | Jan. 2, 1951 |
| 2,687,450 | Morrison et al. | Aug. 28, 1954 |
| 2,897,488 | Rigney et al. | July 28, 1959 |
| 2,922,998 | Stephenson | Jan. 26, 1960 |
| 2,943,964 | Goldenberg | July 5, 1960 |